Figure 1:
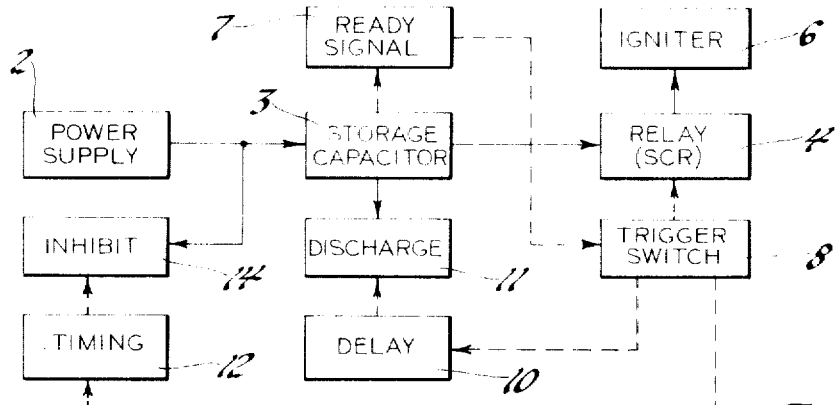

United States Patent

Wilson

[11] 3,788,228
[45] Jan. 29, 1974

[54] FIRING CIRCUIT

[75] Inventor: Robert J. Wilson, Bolingbrook, Ill.

[73] Assignee: General Motors Corporation, Detroit, Mich.

[22] Filed: Mar. 27, 1972

[21] Appl. No.: 238,234

[52] U.S. Cl. ............ 102/70.2 R, 102/70.2 P, 320/1
[51] Int. Cl. ... F42c 11/06, F42c 15/40, F42c 11/00
[58] Field of Search .......... 102/70.2, 70.2 A; 320/1

[56] References Cited
UNITED STATES PATENTS

| 3,537,399 | 11/1970 | Miller | 102/70.2 A |
| 3,417,306 | 12/1968 | Knak | 320/1 |
| 3,350,604 | 10/1967 | Erickson | 320/1 |

Primary Examiner—Benjamin A. Borchelt
Assistant Examiner—Thomas H. Webb
Attorney, Agent, or Firm—Paul Fitzpatrick et al.

[57] ABSTRACT

A firing circuit for a charge such as a round of ammunition includes a voltage regulated power supply effective to raise the voltage from the supply voltage available in the vehicle, a storage capacitor charged by the power supply, and means for discharging the capacitor through the igniter of the charge. A circuit responsive to the charge level of the capacitor indicates when it is ready and enables operation of a trigger switch to effect the firing. After a short time delay, the capacitor is drained of any residual charges due to the opening of the firing circuit. Also, for a time after initiation of firing, a timing circuit closes a shunt which disables the supply of the current to the capacitor, preventing further charge during this timing interval.

4 Claims, 2 Drawing Figures

FIRING CIRCUIT

This invention described and claimed herein was made in the course of work under a contract with the Department of Defense.

DESCRIPTION

My invention relates to electrical firing systems. It is particularly directed to providing surer firing of electrically ignited ammunition charges, although the circuit may well have utility for other purposes.

The system according to the invention involves charging a capacitor to a substantial voltage to provide a high energy low impedance source of energy to fire the ammunition or the like. Because of the high voltage and energy, firing can be assured notwithstanding oxides, chemical residues, corrosion, or contamination resulting from previously fired rounds of ammunition.

The system also includes means for dissipating the stored energy in the capacitor safely in the event of misfire of of incomplete discharge of the condenser during the firing of the round. The system also provides for automatic recharging of the storage capacitor in preparation for the next firing.

A desirable feature of this system is a ready circuit arrangement which indicates the charged condition of the capacitor and prevents firing until the capacitor is fully charged.

The principal objects of my invention are to improve the reliability and safety of circuits or systems for electrically firing ammunition or other charges. A further object is to provide a simple, reliable, and safe system for charging a capacitor and providing high energy surges of current. A still further object is to provide such a system which assures complete discharge of the capacitor upon its actuation and subsequent automatic recharging.

The nature of my invention and its advantages will be clear to those skilled in the art from the succeeding detailed description of its preferred embodiment.

Referring to the drawings, FIG. 1 is a schematic diagram of the preferred system.

Figure 2:
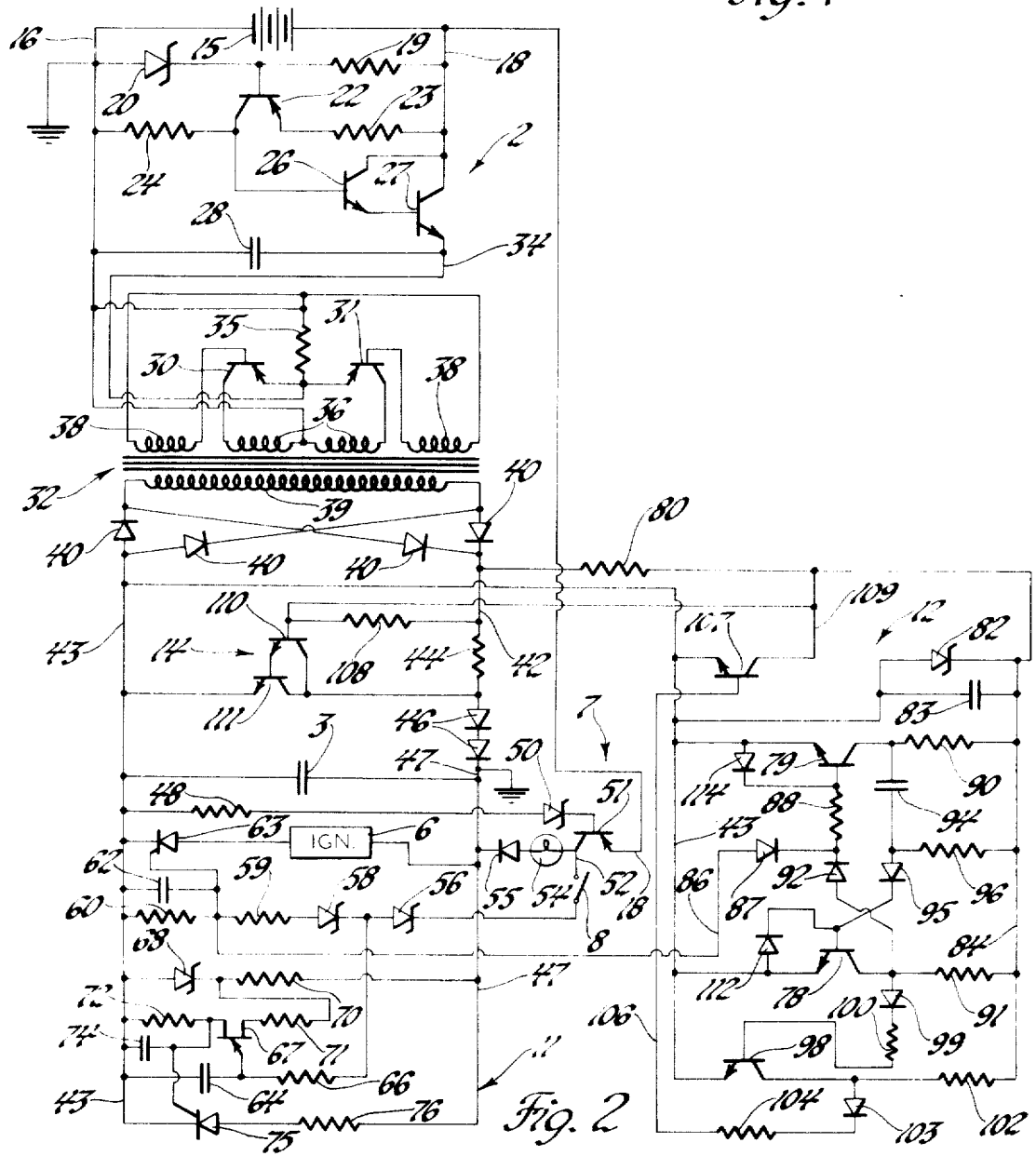

FIG. 2 is a wiring diagram of the preferred system.

Referring first to FIG. 1 for introduction to the detailed description, the system includes a power supply 2 which receives low voltage unregulated direct current and includes a voltage regulator, an inverter, a step-up transformer, and a rectifier to provide direct current at a higher voltage than that available from the source. The power supply is connected to charge a large storage capacitor 3 which is connected to a relay 4, specifically a silicon controlled rectifier (SCR), which controls the discharge of the capacitor to the igniter or electrical firing device 6 of the round of ammunition. A ready signal device 7 signals the fact that the storage capacitor is charged and ready, and also provides an enabling signal to a trigger switch 8 which fires the SCR to discharge the capacitor through the igniter.

The trigger switch also controls through a delay circuit or delay means 10 a discharging or drain circuit 11 which completely discharges the capacitor in the event that it has not been discharged through the igniter. The trigger switch also sets into operation a timing circuit or means 12 which, for a predetermined time after the operation of the trigger switch, makes an inhibiting circuit or means 14 effective. Specifically, the inhilbiting means is a shunt which diverts the output of the power supply and prevents it from charging the storage capacitor. After the cycle of the timing circuit, the power supply is automatically effective to recharge the storage capacitor.

With this introduction to the general nature of the system, we may proceed to the specific circuits shown in FIG. 2 which I deem best suited to effect the purposes of my invention.

The system may be energized by the normal electrical supply circuits of a vehicle such as a tank or other weapons carrier, represented in FIG. 2 by a storage battery 15 which may, for example, have a 24 volt nominal output. The battery or D.C. source energizes the power supply 2 which comprises a voltage regulator, an inverter, a step-up transformer, and a rectifier, and which in the described embodiment provides an output of 120 volts D.C. The negative terminal of battery 15 is grounded through a lead 16. The positive terminal is connected through a lead 18 to the series circuit of resistor 19 and Zener diode 20. The Zener diode maintains a constant 16 volts on the base of a PNP transistor 22, the emitter of which is energized through a resistor 23 from positive line 18. The collector of transistor 22 is grounded through a resistor 24. The collector thus is maintained at a constant potential by the Zener diode. This potential controls two transistors 26 and 27 arranged in a Darlington configuration which control the potential of the current flow from the battery 15 to the inverter. A capacitor 28 connected between the output of the Darlington pair and ground acts as a smoothing filter in the output of the voltage regulation part of the power supply.

This provides a stable voltage on line 34 to two transistors 30 and 31 which drive the input to the step-up transformer 32. The emitters of transistors 30 and 31 are connected to the regulated voltage output line 34 and are grounded through a resistor 35. The collectors of the transistors are grounded through the primary coils 36 of the transformer and the bases of the transistors are grounded through the feedback coils 38. This provides a free-running oscillator circuit which powers the transformer and generates a substantially square wave alternating current output in the secondary coil 39 of the transformer. The high voltage A.C. is rectified by four diodes 40 connected in a conventional bridge rectifier circuit. This provides an approximately 120 volt D.C. output on positive line 42 and negative line 43. Current flows from line 42 through a resistor 44 of 200 ohms and series connected blocking diodes 46 to a grounded line 47.

While a preferred power supply has been described, it will be understood that any stable D.C. source of sufficient potential which may be available may be used to power the firing system.

The storage capacitor 3 of 5600 microfarads capacity is connected between line 47 and the negative line 43. Thus, the output of the power supply serves to charge the capacitor, the charging time being based upon the time constant of resistor 44 and capacitor 3. As the capacitor charges, the negative voltage on line 43 increases in the negative direction.

This voltage signals the charged state of the condenser to the ready signal circuit 7. Line 43 is connected through a resistor 48 and a Zener diode 50 to the base of a PNP transistor 51, the emitter of which is energized from the +24 volt line 18. When the potential difference between the +24 volt line and the minus side of the storage capacitor reaches a value determined by the breakdown voltage of Zener diode 50, the transistor 51 conducts, energizing a line 52 connected to its collector. Line 52 energizes a ready signal light 54 connected to ground through a diode 55, which indicates that the firing circuit is in condition for use. The diode 54 prevents backward flow of current through light 54 which would interfere with normal circuit functioning before capacitor 3 is charged.

Line 52 also provides energizing current to the manually operable trigger switch 8, which is operable to discharge storage condenser 3 through the igniter 6. The trigger switch completes a circuit from the line 52, which is positive, through Zener diodes 56 and 58 resistors 59 and 60 to the negative bus 43. Resistor 60 is shunted by a filter capacitor 62. The potential across capacitor 62 is impressed on the gate of a silicon controlled rectifier (SCR) 63 which completes the circuit from storage capacitor 3 through the ignition device 6 when its gate is energized.

The voltage between Zener diodes 56 and 58 is fed through a resistor 66 to the delay device 10 which comprises a timing capacitor 64 connected to the negative line 43. The potential across capacitor 64 is supplied to the emitter of a unijunction transistor 67. A Zener diode 68, connected to line 43 and through a resistor 70 to line 47, provides a controlled potential to a circuit through resistor 71, the bases of the unijunction transistor, and resistor 72. This potential determines the trigger point of transistor 67. When capacitor 64 is charged to this point, the transistor impresses a voltage spike across resistor 72. This charges a filter capacitor 74 and provides turn-on voltage to the gate of an SCR 75. This SCR is connected in series with a resistor 76 across the storage condenser 3 through lines 43 and 47. This thus constitutes the discharge circuit of drain which dissipates any unused energy in storage capacitor 3 in the event that the round fired without using all the energy stored, or in the event of a misfire or faulty round. One result of discharging the capacitor is to prevent SCR 63 from remaining turned on in the event of a continuous, non-firing, intermediate resistance load in the circuit to the igniter 6.

The multivibrator timing circuit 12 which prevents recharging of the storage capacitor during the firing and discharging cycle is shown at the right side of FIG. 2. The circuit includes a normally conducting transistor 78 and a normally nonconducting transistor 79. A circuit comprising a resistor 80, a Zener diode 82, and a capacitor 83 deliver controlled voltage from lines 42 and 43 to a line 84. The multivibrator is energized from lines 84 and 43. The multivibrator is triggered by a signal on a line 86 which is connected to the energizing circuit for the gate of SCR 63. Line 86 is connected through isolating diode 87 and resistor 88 to the base of transistor 79, the collector of which is supplied through resistor 90 from line 84 and the emitter of which is connected to line 43. There is also a circuit to the base of transistor 79 from line 84 through resistor 91, diode 92, and resistor 88. Transistor 78 has its collector connected to resistor 91, its emitter to line 43, and its base to line 84 through resistor 96 and a diode 95. With transistor 78 conducting, the drop through resistor 91 will hold transistor 79 turned off.

When SCR 63 is triggered, the voltage pulse sent through line 86 and resistor 88 raises the base potential of transistor 79, causing it to conduct. This effectively ties one terminal of a capacitor 94 to the negative line 43. The other terminal of the capacitor is connected through diode 95 to the base of transistor 78. This lowers the potential on the base of transistor 78, which normally is energized through a resistor 96 and diode 95, so that the transistor 78 turns off. This situation with transistor 79 conducting and transistor 78 nonconducting persists until capacitor 94 is charged through resistor 96 to a point at which the voltage level on the base of 78 again allows it to conduct. When transistor 78 conducts, the drop through resistor 91 turns off transistor 79, completing the flip-flop cycle.

During the time that transistor 78 is turned off, a transistor 98 is turned on by base drive through resistor 91, a diode 99, and a resistor 100. The emitter of transistor 98 is connected to line 43 and its collector is connected to line 84 through a resistor 102. With transistor 98 conducting, the drop through resistor 102 communicated through diode 103, resistor 104, and a line 106 to the base of a transistor 107 turns off transistor 107. This transistor is energized by a circuit from line 42 through resistor 108 and line 109 to the collector of the transistor, the emitter being connected to line 43. This turns on two transistors 110 and 111, connected as a Darlington pair, which provides the inhibiting circuit 14 of FIG. 1. Transistor 110 turns on transistor 111 which establishes a shunt from the power supply line 42 through resistor 44 and transistor 111 to the negative line 43. As a result, recharging of the storage capacitor is prevented during the predetermined period of time until timing capacitor 94 charges to a point at which the multivibrator reverts to its stable condition. When this occurs, the shunt is opened and recharging of the storage capacitor automatically ensues.

With recharging of the storage capacitor prevented for a definite period, SCR's 63 and 75 are prevented from remaining on after the capacitor has been discharged.

Diodes 112 and 114 are provided to protect the base-emitter junctions of transistors 78 and 79 respectively.

The structure, principles, and mode of operation of the preferred electrical circuit or system will be clear to those skilled in the electronic arts from the foregoing description.

However, for whatever informational value it may have, the following data as to components of the electrical system is presented. It will, of course, be understood that components may be substituted or modified to suit particular system requirements or to benefit by developments in the electronic art.

| Transistor | Type | Transistor | Type |
|---|---|---|---|
| 22 | 2N1132 | 67 | 2N1671B |
| 26 | 2N3767 | 78 | 2N699 |
| 27 | 2N3771 | 79 | 2N699 |
| 30 | 2N4399 | 98 | 2N699 |
| 31 | 2N4399 | 107 | MJ420 |
| 51 | 2N3741 | 110 | MJ420 |
|  |  | 111 | MJ3029 |

| Resistor | Kilohms | Watts | Resistor | Kilohms | Watts |
|---|---|---|---|---|---|
| 19 | 1 | 1/2 | 72 | 1 | 1/4 |
| 23 | 1 | 1/2 | 76 | 1 | 10 |
| 24 | 33 | 1/4 | 80 | 10 | 2 |
| 35 | .005 | 1 | 88 | 15 | 1/2 |
| 44 | .220 | 10 | 90 | 6.8 |  |
| 48 | 15 | 1/2 | 91 | 51 | 1/2 |
| 59 | .47 | 1/4 | 96 | 100 | 1/2 |
| 60 | .47 | 1/4 | 100 | 10 | 1/2 |
| 66 | 3000 | 1/4 | 102 | 51 | 1/2 |
| 70 | 22 | 1/4 | 104 | 10 | 1/2 |
| 71 | 3.9 | 1/4 | 108 | 47 | 1/2 |

| Capacitor | Microfarads | Volts |
|---|---|---|
| 3 | 5600 | 150 |
| 28 | 4.7 | 50 |
| 62 | .22 | 50 |

| Capacitor | Microfarads | Volts |
|---|---|---|
| 64 | .22 | 50 |
| 74 | .22 | 50 |
| 94 | 12 | 30 |
| Zener | | Type |
| 20 | | 1N3024B |
| 50 | | 1N4759 and 1N4750 in series |
| 56 | | 1N4761 |
| 58 | | 1N4761 |
| 68 | | 1N4751 |
| 82 | | 1N3033 |

The diodes 40 constitute a Motorola No. MDA-942A-6 diode bridge. Other diodes are type IN4005. The SCR's are General Electric C35C.

It will also be clear that the system or circuit is particularly suited to the requirements of firing circuits for ammunition and other purposes and provides the advantages of safety, reliable operation, automatic recycling, and other features referred to earlier in the description.

The detailed description of the preferred embodiment of the invention for the purpose of explaining the principles thereof is not to be considered as limiting or restricting the invention, since many modifications may be made by the exercise of skill in the art.

I claim:

1. An electrical system for providing a surge of current to a one-shot load at will comprising, in combination, a source of current, a storage capacitor chargeable from the source, means optionally operable only upon attainment of a predetermined capacitor charge level for connecting the capacitor to the one-shot load for discharge through the load, means for connecting the capacitor to an auxiliary load to assure complete discharge of the capacitor effective a predetermined time after connection to the load, and means operative to inhibit recharging of the capacitor for a predetermined time to allow complete discharge and thereafter initiate recharging of the capacitor.

2. An electrical system for providing a surge of current to a one-shot load at will comprising, in combination, a source of current at regulated voltage, a storage capacitor chargeable from the source, means optionally operable only upon attainment of a predetermined capacitor charge level for connecting the capacitor to the load for discharge through the load, means for connecting the capacitor to an auxiliary load to assure complete discharge of the capacitor effective a predetermined time after connection to the load, and means operative to effectively disconnect the capacitor from the source during discharge of the capacitor and thereafter reconnect the capacitor to the source.

3. An energizing circuit for an igniter for ammunition and the like comprising, in combination, power supply means; a storage capacitor connected to the power supply means for charging thereby; means for detecting a charged condition of the capacitor; relay means operative to discharge the capacitor through a circuit including an igniter; trigger switch means operable by an operator under control of the detecting means to operate the relay means when the capacitor is charged; draining means operable to discharge the capacitor; delay means actuated upon energization of the igniter effective after a predetermined time to operate the draining means; inhibiting means operable to disable the connection from the power supply means to the capacitor; and timing means actuated upon energization of the igniter effective to maintain the inhibiting means effective for a predetermined time greater than the time delay effected by the delay means.

4. An energizing circuit for an igniter for ammunition and the like comprising, in combination, a low voltage D.C. source; power supply means effective to generate higher voltage D.C. energized by the source; a storage capacitor connected to the power supply means for charging thereby; indicator means for indicating the charged condition of the capacitor; relay means operative to discharge the capacitor through a circuit including an igniter; trigger switch means responsive to the indicator means and operable by an operator to operate the relay means when the capacitor is charged; draining means operable to discharge the capacitor; delay means actuated upon energization of the igniter effective after a predetermined time to operate the draining means; inhibiting means operable to disable the connection from the power supply means to the capacitor; and timing means actuated upon energization of the igniter effective to maintain the inhibiting means effective for a predetermined time greater than the time delay effected by the delay means.

* * * * *